(12) United States Patent
Kim et al.

(10) Patent No.: US 11,132,302 B2
(45) Date of Patent: Sep. 28, 2021

(54) METHOD AND ELECTRONIC DEVICE FOR DATA PROCESSING BETWEEN MULTIPLE PROCESSORS

(71) Applicant: SAMSUNG ELECTRONICS CO., LTD., Suwon-si (KR)

(72) Inventors: Rakie Kim, Suwon-si (KR); Min-Wook Ahn, Seoul (KR); Kyung-Mok Kum, Suwon-si (KR); Keon-Cheol Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 16/480,255

(22) PCT Filed: Jan. 23, 2018

(86) PCT No.: PCT/KR2018/000997
§ 371 (c)(1),
(2) Date: Jul. 23, 2019

(87) PCT Pub. No.: WO2018/135925
PCT Pub. Date: Jul. 26, 2018

(65) Prior Publication Data
US 2019/0377691 A1 Dec. 12, 2019

(30) Foreign Application Priority Data
Jan. 23, 2017 (KR) .................. 10-2017-0010673

(51) Int. Cl.
*G06F 12/10* (2016.01)
*G06F 12/1081* (2016.01)
*G06F 3/06* (2006.01)

(52) U.S. Cl.
CPC ........ *G06F 12/1081* (2013.01); *G06F 3/0604* (2013.01); *G06F 3/0655* (2013.01); *G06F 3/0673* (2013.01); *G06F 2212/621* (2013.01)

(58) Field of Classification Search
CPC .. G06F 3/0655; G06F 12/1081; G06F 3/0604; G06F 3/0673; G06F 2212/621; H04N 1/60
See application file for complete search history.

(56) References Cited

U.S. PATENT DOCUMENTS

| | | | | |
|---|---|---|---|---|
| 5,293,586 A | * | 3/1994 | Yamazaki | G06K 15/02 345/501 |
| 7,446,774 B1 | * | 11/2008 | MacInnis | H04N 5/44508 345/519 |
| 2003/0106053 A1 | * | 6/2003 | Sih | H04N 19/423 725/25 |
| 2008/0215768 A1 | | 9/2008 | Reid et al. | |

(Continued)

FOREIGN PATENT DOCUMENTS

| | | |
|---|---|---|
| JP | 3128799 B2 | 1/2001 |
| JP | 2001-326893 A | 11/2001 |
| KR | 10-0952861 B1 | 4/2010 |

OTHER PUBLICATIONS

International Search Report (PCT/ISA/210) dated Apr. 26, 2018 issued by the International Searching Authority in counterpart Application No. PCT/KR2018/000997.

(Continued)

*Primary Examiner* — Ernest Unelus
(74) *Attorney, Agent, or Firm* — Sughrue Mion, PLLC

(57) ABSTRACT

An electronic device may comprise: a first memory for storing first data at a designated rate; a first processor connected to the first memory and configured to divide the first data into multiple second data, each having a size smaller than the size of the first data; a second memory for storing at least some of the multiple second data at a rate faster than the designated rate; a second processor connected to the second memory and configured to process the at least (Continued)

some of the multiple second data; and a DMA control module, connected to the second processor, for transmitting/receiving data between the first memory and the second memory, wherein the DMA control module is configured to: at least on the basis of a processing command for the multiple second data which is transmitted from the first processor to the second processor, receive, from the first memory, the at least some of the multiple small-sized second data divided from the first data; transmit the at least some of the multiple second data to the second processor; and transmit, to the first memory, third data processed by the second processor by using the at least some of the multiple second data.

13 Claims, 11 Drawing Sheets

(56) References Cited

U.S. PATENT DOCUMENTS

2009/0136142 A1   5/2009   Kosaraju
2015/0046914 A1   2/2015   Sahoo
2015/0199277 A1   7/2015   Kipp

OTHER PUBLICATIONS

Zinner et al., "ROS-DMA: A DMA Double Buffering Method for Embedded Image Processing with Resource Optimized Slicing", Proceedings of the Twelfth IEEE Real-Time and Embedded Technology and Applications Symposium (RTAS'06), 2006, 12 pages total.

* cited by examiner

METHOD AND ELECTRONIC DEVICE FOR DATA PROCESSING BETWEEN MULTIPLE PROCESSORS

CROSS-REFERENCE TO RELATED APPLICATION(S)

This application is a National Phase Entry of PCT International Application No. PCT/KR2018/000997, which was filed on Jan. 23, 2018, and claims priority to Korean Patent Application No. 10-2017-0010673, which was filed on Jan. 23, 2017, the contents of which are incorporated herein by reference.

BACKGROUND

1. Field

The present disclosure relates to an electronic device and method for processing an image.

2. Description of the Related Art

Direct memory access (DMA) is a technique for directly transmitting data between memories or a memory and an input/output device without by way of a central processing unit (CPU).

The DMA does not need intervention of the CPU in data transmission, such that the CPU may perform other tasks, improving CPU management. Thus, the DMA may be used usefully in a digital signal processing domain.

SUMMARY

To use the DMA, a code for controlling the DMA has to be inserted into an operation code. As a result, input data has to be provided at a time when data for an operation is needed, and output data has to be generated at a time when the operation ends. This case, however, may have problems as described below.

First, the DMA and image location calculation are frequently and commonly used in an image processing algorithm, and repetition of a common code may reduce recyclability of the code. The DMA and the image location calculation require direct control over hardware, and thus a designer has to be fully aware of the architecture of a processor such as a digital signal processor (DSP). Consequently, a significant amount of time may be required for the designer to program the DMA and the image location calculation.

Moreover, when multiple processors are used in different heterogeneous operation environments, it may be difficult to perform programming such that one processor transfers parameters to another processor.

According to various embodiments, a function of inputting image data to be processed through the DMA while processing an image may be provided. Moreover, various embodiments of the present disclosure may provide an electronic device that executes an algorithm in which an image process operation code and a DMA code are separated in a system where multiple processors operate in heterogeneous operation environments.

An electronic device according to various embodiments of the present disclosure includes a first memory storing first data at a designated speed, a first processor connected with the first memory and configured to divide the first data into a plurality of second data, each having a size smaller than a size of the first data, a second memory storing at least some of the plurality of second data at a speed higher than the designated speed, a second processor connected with the second memory and configured to process at least some of the plurality of second data, and a direct memory access (DMA) control module connected with the second processor and configured to transmit and receive data between the first memory and the second memory, in which the DMA control module is configured to receive from the first memory, at least some of the plurality of smaller-size second data divided from the first data, at least based on a process command with respect to the plurality of second data, transmitted from the first processor to the second processor, to transmit the at least some of the plurality of second data to the second processor, and to transmit third data processed by the second processor using the at least some of the plurality of second data to the first memory.

A control method for an electronic device according to various embodiments of the present disclosure includes storing first data in a first memory at a designated speed, dividing, by a first processor connected with the first memory, the first data into a plurality of second data, each having a size smaller than a size of the first data, storing at least some of the plurality of second data at a speed higher than the designated speed, processing, by a second processor connected with the second memory, at least some of the plurality of second data, and transmitting and receiving, by a DMA control module connected with the second processor, data between the first memory and the second memory, in which the DMA control module is configured to receive from the first memory, at least some of the plurality of smaller-size second data divided from the first data, at least based on a process command with respect to the plurality of second data, transmitted from the first processor to the second processor, to transmit the at least some of the plurality of second data to the second processor, and to transmit third data processed by the second processor using the at least some of the plurality of second data to the first memory.

According to various embodiments, an electronic device and method for processing an image is provided in which a function of inputting image data to be processed through the DMA while processing an image may be provided. Moreover, various embodiments of the present disclosure may provide an electronic device and method for processing an image, which executes an algorithm where an image process operation code and a DMA code are separated, when multiple processors operate in heterogeneous operation environments.

DETAILED DESCRIPTION

Figure 1:
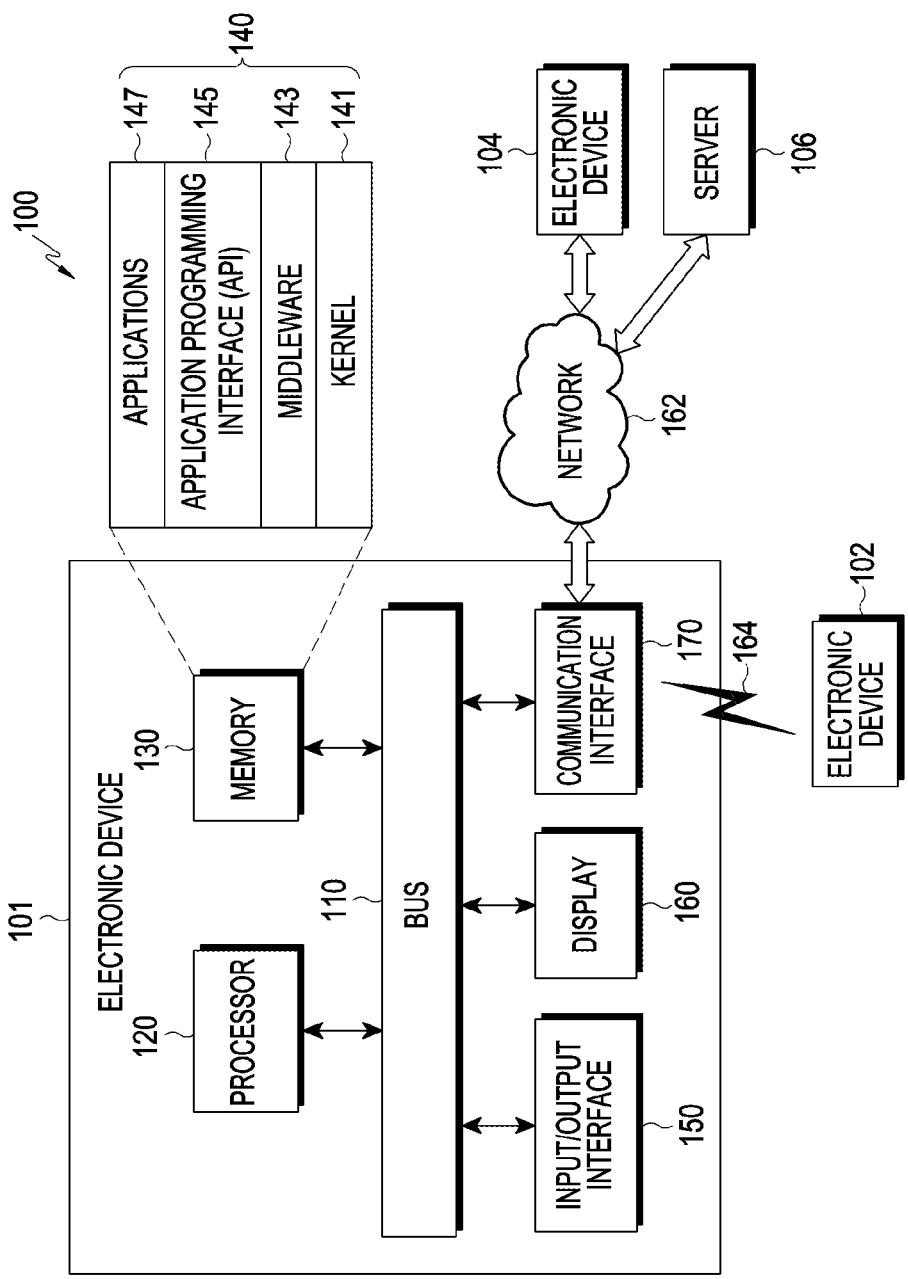
FIG. 1 is a block diagram of an electronic device and a network according to various embodiments.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, mobile medical equipment, a camera, or a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implantable circuit, or the like. In some embodiments, the electronic device may include, for example, at least one of a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic frame.

In other embodiments, the electronic device may include at least one of various medical equipment (e.g., various portable medical measurement devices (a blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of furniture, a building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device (e.g., an artificial intelligence electronic device).

FIG. 1 is a block diagram of an electronic device and a network according to various embodiments of the present disclosure. Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and transferring communication (e.g., a control message or data) between the elements 110 to 170. The processor 120 may include one or more of a central processing unit (CPU), an application processor (AP), and a communication processor (CP). The processor 120 may perform operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may transfer, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receive a touch, a gesture, proximity, or a hovering input, for example, by using an electronic pen or a part of a body of a user. The communication interface 170 establishes communication between the electronic device 101 and an external device (e.g., the vehicle device 102, the electronic device 104, or the server 106). For example, the communication interface 170 may be connected to a network 162 through a wireless communication or wired communication to communicate with an external device (e.g., the second external electronic device 104 or the server 106).

Wireless communication may include a cellular communication protocol using at least one of, for example, long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and so forth. According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of a universal serial bus (USB), a high definition multimedia interface (HDMI), a recommended standard (RS)-232, power line communication, a plain old telephone service (POTS), and so forth. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and transfer the execution result to the electronic device 101. The electronic device 101 may then process or further process the received result to provide the requested function or service. To that end, a cloud computing, distributed computing, or client-server computing technology may be used, for example.

According to various embodiments of the present disclosure, the first data and the second data may include image data, and the first processor may be configured to determine at least one of a location, a size, a shape, or a number of the at least some of the plurality of second data, based on the second memory.

According to various embodiments of the present disclosure, the at least some of the plurality of second data may include first partial data, second partial data, and third partial data, and the second processor is configured to process the second partial data after processing the first partial data, and the DMA control module may be configured to transmit the processed first partial data to the first memory and receive the third partial data from the first memory, while the second processor processes the second partial data.

According to various embodiments of the present disclosure, the at least some of the plurality of second data may be divided into blocks, each having an equal size.

According to various embodiments of the present disclosure, the second processor may be configured to receive process data which includes data for setting the at least some of the plurality of second data and data for setting processing with respect to the at least some of the plurality of second data, and the process data may include a location and a size of the at least some of the plurality of second data, overlap of processing with respect to the at least some of the plurality of second data, a non-processing area, a process order, a process location, or a combination thereof.

According to various embodiments of the present disclosure, the second processor may be configured to process the at least some of the plurality of second data and control the DMA control module by using the process command and the process data.

According to various embodiments of the present disclosure, the at least some of the plurality of second data may be adjusted to be maintained to have a designated size and may be processed by the second processor.

According to various embodiments of the present disclosure, the DMA control module may include multiple channels comprising a first channel and a second channel, and may be configured to transmit the third partial data through the first channel during transmission of the second partial data through the second channel when completing transmission of the first partial data through the first channel.

According to various embodiments of the present disclosure, the second processor may be configured to transmit determination data that determines the third partial data to the DMA control module, and the DMA control module may be configured to receive the at least some of the plurality of second data corresponding to the determination data from the first memory.

According to various embodiments of the present disclosure, the second processor may further include a cache storing a process identification for identifying processing of the second processor with respect to the at least some of the plurality of second data and the process data.

According to various embodiments of the present disclosure, the process command may be implemented with a process command algorithm that prescribes data transmission and reception between the first processor and the second processor, and the process command algorithm may include a parameter corresponding to at least one of processing with respect to the at least some of the plurality of second data, adjustment of the processing, a first memory address corresponding to a part of the first memory, or a second memory address corresponding to a part of the second memory.

According to various embodiments of the present disclosure, the first memory address and the second memory address may be determined based on the first processor, and the first processor may be configured to translate the first memory address and the second memory address into addresses corresponding to an operation environment of the second processor based on the second processor.

According to various embodiments of the present disclosure, the first processor may be configured to generate a packet for transferring the process command and transmit the packet to the second processor, and the packet may include the process identification for identifying processing of the second processor with respect to the at least a part of the plurality of second data, a packet identification for identifying the packet, and data regarding the parameter.

According to various embodiments of the present disclosure, the first processor may be configured to transmit the packet to the second processor based on a first-in first-output (FIFO) algorithm.

According to various embodiments of the present disclosure, the second processor may be configured to process the at least some of the plurality of second data based on reception of the packet.

According to various embodiments of the present disclosure, the second processor may be configured to transmit information related to a process state of the plurality of second data to the first processor.

Figure 2:
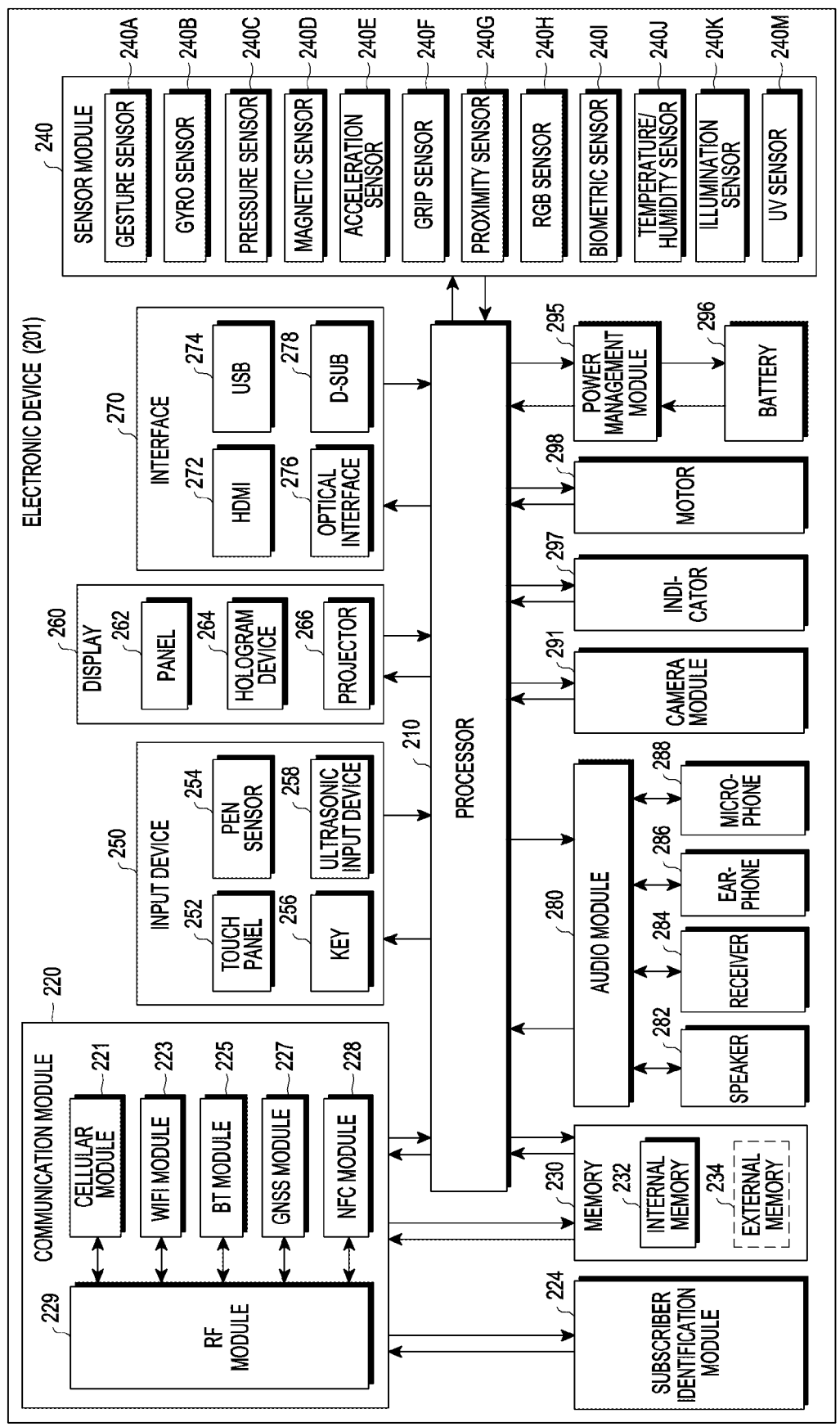
FIG. 2 is a block diagram of an electronic device according to various embodiments.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program and performs processing and operations with respect to various data. The processor 210 may be implemented with, for example, a system on chip (SoC). According to an embodiment of the present disclosure, the server 210 may include a graphic processing unit (GPU) and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, an NFC module 228, and a radio frequency (RF) module 229. The cellular module 221 may provide, for example, a voice call, a video call, a text service, or an Internet service over a communication network. According to an embodiment of the present disclosure, the cellular module 221 may identify and authenticate the electronic device 201 in a communication network by using the SIM 224 (e.g., a SIM card). According to an embodiment of the present disclosure, the cellular module 221 may perform at least one of functions that may be provided by the processor 210. According to an embodiment of the present disclosure, the cellular module 221 may include a communication processor (CP). According to some embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment of the present disclosure, at least one of the cellular module 221, the WiFi module 223, the BT module 225, the GNSS module 227, or the NFC module 228 may transmit and receive an RF signal through the separate RF module. The SIM 224 may, for example, include a card including a SIM or an embedded SIM, and may include unique identification information (e.g., an integrated circuit card identifier (IC-CID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory, and a solid state drive (SSD), etc.). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., red/green/blue (RGB) sensor), a biometric sensor 240I, a temperature/humidity sensor 240J, an illumination sensor 240K, and an ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment of the present disclosure, the panel 262 may include a pressure sensor (or a "force sensor") capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. The interface 270 may include an HDMI 272, a USB 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, an SD/multi-media card (MMC) interface, or an Infrared Data Association (IrDA) interface.

The audio module 280 may bi-directionally convert sound and an electric signal. At least one element of the audio module 280 may be included in the input/output interface 145 illustrated in FIG. 1. The audio module 280 may process sound information input or output through the speaker 282, the receiver 284, the earphone 286, or the microphone 288. The camera module 291 may be, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 may manage power of the electronic device 201. According to an embodiment of the present disclosure, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generate vibration or a haptic effect. The electronic device 201 may include a device for supporting the mobile TV (e.g., a GPU) to process media data according to a standard such as digital multimedia broadcasting (DMB), digital video broadcasting (DVB), or media-Flo™. Each of the foregoing elements described herein may be configured with one or more components, names of which may vary with a type of the electronic device. In various embodiments of the present disclosure, some components of the electronic device (e.g., the electronic device 201) may be omitted or may further include other elements, and some of the components may be coupled to form one entity and identically perform functions of the components before being coupled.

Figure 3:
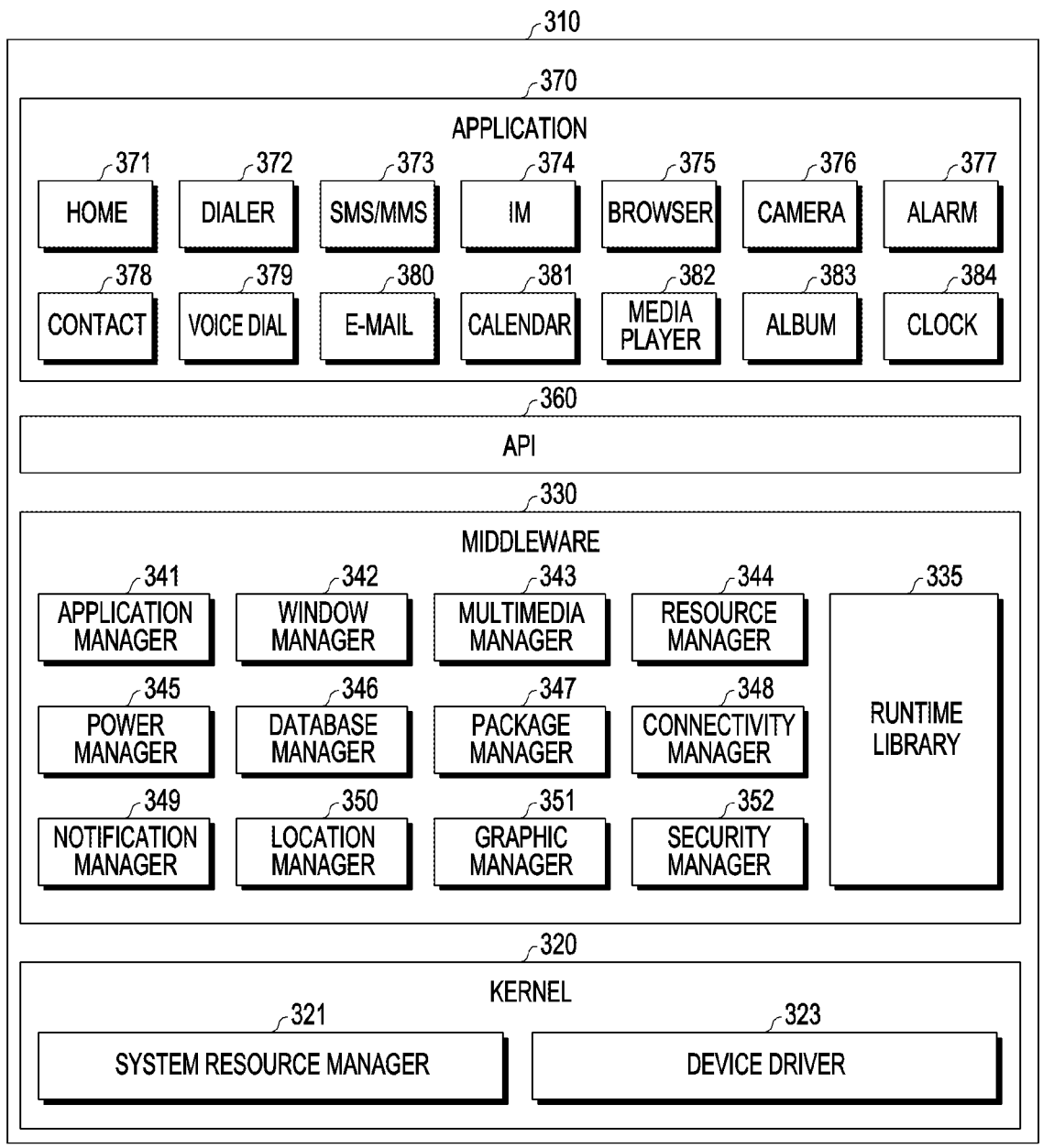
FIG. 3 is a block diagram of a programming module according to various embodiments.

FIG. 3 is a block diagram of a programming module according to various embodiments of the present disclosure. According to an embodiment of the present disclosure, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the electronic device 102 or 104, or the server 106).

The kernel 320 may include a system resource manager 321 and/or a device driver 323. The system resource manager 321 may perform control, allocation, retrieval of system resources, and so forth. According to an embodiment of the present disclosure, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 may manage a life cycle of the applications 370. The window manager 342 may manage a graphic user interface (GUI) resource used in a screen. The multimedia manager 343 may recognize a format necessary for playing media files and perform encoding or decoding on a media file by using a codec appropriate for a corresponding format. The resource manager 344 may manage a source code or a memory space of the applications 370. The power manager 345 may manage a battery or power and provide power information necessary for an operation of the electronic device. According to an embodiment of the present disclosure, the power manager 345 may operate with basic input/output system (BIOS). The database manager 346 may generate, search or change a database used for at least one application among the applications 370. The package manager 347 may manage the installation or update of an application distributed in a package file format.

The connectivity manager 348 may manage a wireless connection. The notification manager 349 may provide an event, e.g., an arriving message, an appointment, proximity notification, etc. The location manager 350 may manage location information about an electronic device. The graphic manager 351 may manage, for example, a graphic effect to be provided to a user or a user interface relating thereto. The security manager 352 may provide, for example, system security or user authentication. According to an embodiment of the present disclosure, the middleware 330 may further include a telephony manager for managing a voice or video call function of the electronic device or a middleware module forming a combination of functions of the above-described components. According to an embodiment of the present disclosure, the middleware 330 may provide a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may transfer notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

Figure 4:
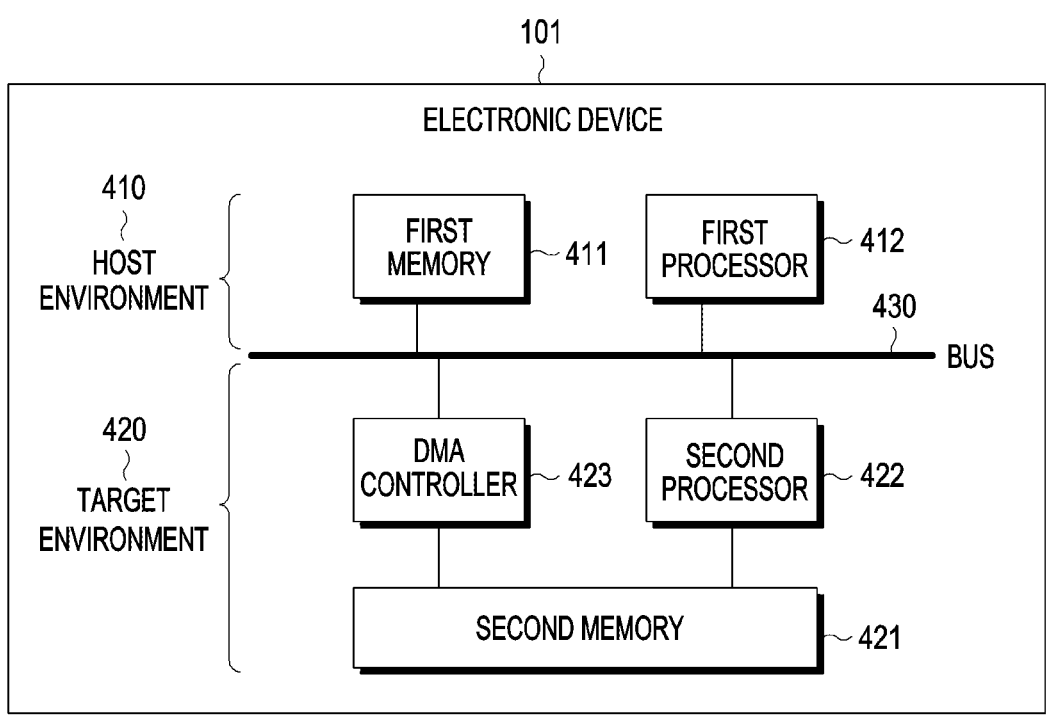
FIG. 4 is a block diagram for describing host and target environments according to an embodiment.

FIG. 4 is a block diagram for describing host and target environments according to an embodiment.

As shown in FIG. 4, in a host environment 410 and a target environment 420, the electronic device 101 may include a first memory 411, a first processor 412, a second memory 421, a second processor 422, a direct memory access (DMA) controller 423, and a second memory 421. The first memory 411, the first processor 412, the second memory 421, the second processor 422, and the DMA controller 423 may be interconnected through a bus 430. The second memory 421 may be connected to the second processor 422 and the DMA controller 423.

The first memory 411 and the first processor 412 may belong to the host environment 410, and the first memory 421, the DMA controller 423, and the second processor 422 may belong to the target environment 420.

The first memory 411 may be a storage device that is directly controlled by the first processor 412 or DMA-controlled by the DMA controller 423. The first memory 411 may be an external memory. A program or data may be memorized in the first memory 411, and may be transmitted from the first memory 411 to the second memory 421 depending on a need. The first memory 411 may have a larger storage capacity and lower data storage and readout speeds than the second memory 421. For example, the first memory 411 may have a first data access speed. The first data access speed may be lower than a data access speed of the second memory 421, i.e., a second data access speed. The first memory 411 may have a first storage capacity. The first storage capacity may be larger than a storage capacity of the second memory 421, i.e., a second storage capacity. The first memory 411 may be referred to as an auxiliary memory device.

The second memory 421 may be directly controlled by the first processor 421 or the second processor 422. The second memory 421 may be DMA-controlled by the DMA controller 423. The second memory 421 may focus on a speed rather than a storage capacity. Thus, the second memory 421 may have a smaller storage capacity and higher data storage and readout speeds than the first memory 411. For example, the second memory 421 may have the second data access speed and the second storage capacity. The second data access speed may be higher than the first data access speed. The second storage capacity may be smaller than the first storage capacity. The second memory 421 may be referred to as a main memory device.

The first processor 412 may read data stored in the first memory 411, calculate the read data based on a stored instruction, and store the calculated data in the first memory 411. The first processor 412 may provide a command to perform a particular operation to the second processor 422. The first processor may be a CPU.

The second processor 422 may read data stored in the second memory 421, calculate the read data based on a stored instruction, and store the calculated data in the second memory 421. The second processor 422 may store or read data in or from the first memory 411 through the DMA controller 423. The second processor 422 may be a digital signal processor (DSP). The second processor 422 may be a processor in charge of digital signal processing. The first processor 412 may be a general-purpose processor, whereas the second processor 422 may be a digital signal processing-dedicated processor that is capable of performing high-speed calculation and is compactified. The second processor 422 may perform basic functions such as filtering, Fourier transform, calculation of a correlation function, encoding, modulation/demodulation, differentiation, integration, and adaptive signal processing. When the second processor 422 is in the target environment 420, the second processor 422 may receive a command for performing a particular operation from the first processor 412 of the host environment 410 and perform the particular operation according to the command.

The DMA controller 423 may transfer data between the first memory 411 and the second memory 421. The DMA controller 423 may enable data movement between the first memory 411 and the second memory 421, without intervention of the first processor 412 or the second processor 422.

The bus 430 may be a path in which data moves among the first memory 411, the second processor 412, the DMA controller 423, and the second processor 422. The bus 430 may correspond to the bus 110 of the electronic device 101 of FIG. 1. The bus 430 of FIG. 4 may function as a data moving path based on DMA.

Figure 5:
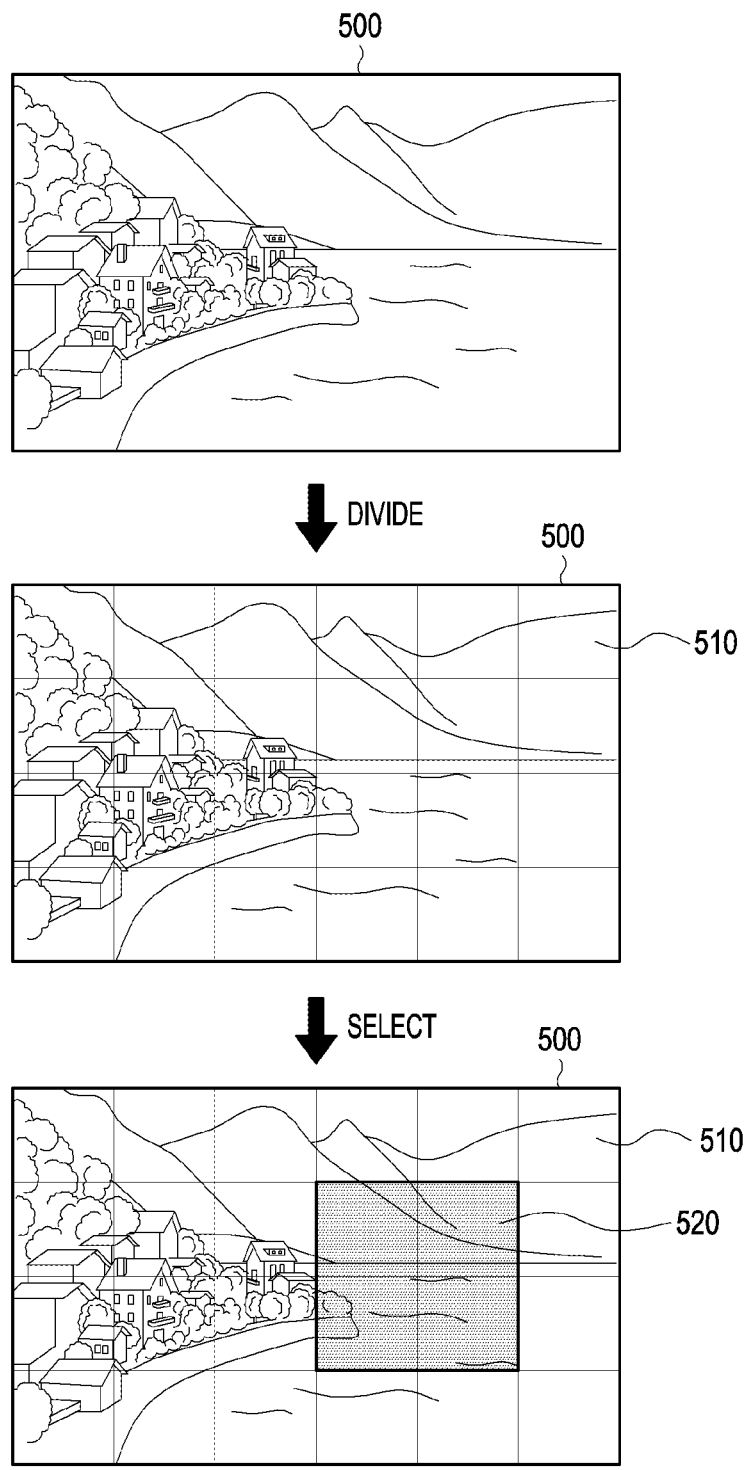
FIG. 5 is an exemplary diagram for describing a concept of an image and an input tile according to an embodiment.

FIG. 5 is an exemplary diagram for describing a concept of an image and an input tile according to an embodiment.

The electronic device 101 may change characteristics of an image through image processing using the first processor 412 or the second processor 422. For example, types of the image processing may include blurring, sharpening, corner detection, etc. The image processing may include blurring, sharpening, and corner detection performed on the image by the first processor 412 or the second processor 422. More specifically, in the image processing, the first processor 412 or the second processor 422 may apply a filter or functions corresponding to a type of the image processing to pixels of the image. Herein, processing or data processing may be understood as image processing or image processing with respect to image data.

The image processing may be performed by the first processor 412 or the second processor 422 in the unit of a tile. Data of the image may be divided into a plurality of tilt data having a small size, and the data of the image may be processed as the plurality of tile data are sequentially processed. The data of the image may be processed as at least some of the plurality of tile data are processed.

For example, referring to FIG. 5, an image 500 may be divided into a plurality of tiles 510 by the first processor 412 or the second processor 422. The first processor 412 or the second processor 422 may select some or all tiles from among the plurality of tiles 510 and process the selected tiles 520.

The first processor 412 or the second processor 422 may divide the image 500 into the plurality of tiles 510 to process the image 500 stored in the first memory 411. Each tile 510 may be a particular part of the image 500 divided for image processing with respect to the image 500. The image 500 may include multiple pixels. Each of the plurality of tiles 510 may include a single pixel or a plurality of pixels. Each of the plurality of tiles 510 is a unit of image processing, and image processing may be performed on each tile by the first processor 412 or the second processor 422. According to a method for dividing the image 500, the plurality of tiles 510 may have various forms. In FIG. 5, the image 500 may be divided into a total of 6×4=24 rectangular tiles 510.

The first processor 412 or the second processor 422 may select a target to be subject to image processing from among the plurality of tiles 510. The selected at least one tile 510 may be referred to as an input tile 520. For example, the first processor 412 or the second processor 422 may select some of the plurality of tiles 510 as the input tile 520. The first processor 412 or the second processor 422 may select all of the plurality of tiles 510 as the input tile 520. As the input tile 520, a single tile or a plurality of tiles among the plurality of tiles 510 may be sequentially selected. A tile selected as the input tile 520 from among the plurality of tiles 510 may be determined from process data. The process data may be described later.

As such, a process in which the first processor 412 or the second processor 422 divides the image 500 into the plurality of tiles 510 and some or all of the plurality of tiles 510 are selected may be understood as determining (calculating) a tile(s). The first processor 412 or the second processor 422 may calculate a tile to process the image 500. Calculation of the tile may include determining how large each of the plurality of tiles 510 that is to be the input tile 520 is (determining a size of each tile) and determining which tile among the plurality of tiles 510 of the image 500 is to be determined as the tile having the size (determining a location of the tile). Through determination of the tile, the first processor 412 or the second processor 422 may determine at least one of a location, a size, a shape, or the number of tiles to be processed.

The input tile 520 may be read from the first memory 411 by the DMA controller 423 and stored in the second memory 421, and the input tile 520 may be temporarily stored in the second memory 421 until being read by the second processor 422. Herein, the DMA controller 423 may be controlled by the first processor 412 or the second processor 422 to read and store the input tile 520. The second memory 421 has a smaller storage capacity and a higher access speed than the first memory 411, such that characteristics of the input tile 520 temporarily stored in the second memory 421 may depend on characteristics of the second memory 421. The characteristics of the input tile 520 may include at least one of a location, a size, a shape, and the number of input tiles 520, and the characteristics of the second memory 421 may include a storage capacity and an access speed of the second memory 421. For example, the first processor 412 or the second processor 422 may need to calculate and determine a size of each input tile 520 not to exceed the storage capacity of the second memory 421.

For tile division and selection, the first processor 412 or the second processor 422 has to know a size of a unit tile and locations of tiles to be processed in the image 500. The first processor 412 or the second processor 422 may determine an area and a form of each of the plurality of divided tiles 510 based on the size of the unit tile (tile division), and determine the input tile 520 from among the plurality of tiles 510 based on the locations of the tiles to be processed (tile selection). The first processor 412 or the second processor 422 may perform tile calculation including tile division and tile selection.

Herein, the process data may include the size of the unit tile and the locations of the tiles to be processed. The first processor 412 or the second processor 422 may perform tile calculation based on the process data. Transferring of the process data to the first processor 412 or the second processor 422 may be implemented by receiving the process data from a user of the electronic device 101 through an application programming interface (API).

The first processor 412 or the second processor 422 may control the DMA controller 423 to move the input tile 520 determined from tile calculation from the first memory 411 to the second memory 421. The input tile 520 determined from tile calculation may be stored in the second memory 421 by the DMA controller 423. Thereafter, the input tile 520 stored in the second memory 421 may be read from the second memory 421 and processed by the second processor 422.

The second processor 422 may process some or all of the plurality of tiles 510. When the input tile 520 is stored from the first memory 411 to the second memory 421, the second processor 422 may read the input tile 520 from the second memory 421 and process the input tile 520, thus generating an output tile 610. Herein, the input tile 520 may include some or all of the plurality of tiles 510.

The first processor 412 or the second processor 422 may be provided with the process data. The process data may include first process data for setting the input tile 520 from among the plurality of tiles 510 of the image 500 and second process data for setting processing.

The first process data for setting the input tile 520 may include a location and a size for setting the input tile 520. The first process data may include information regarding requirements needed to store or read a tile in or from the memory 411. The location and size of the first process data may be used in tile calculation. More specifically, the first process data may include a location and a size required for reading the input tile 520 from the first memory 411 or storing the output tile 610 in the first memory 411.

The second process data for processing the input tile 520 may include an overlap and a non-processing area between the input tiles 520, and a process order and a process location of the input tile 520. That is, the second process data may include a processing method, a processing type (e.g., blurring, sharpening, and corner detection), etc., related to processing of the input tile 520. For example, the second process data may pertain to an order of reading the input tile 520 from the first memory 411, an order of storing the output tile 610 from the first memory 411, or a type of image processing to be applied to the input tile 520.

The location for setting the input tile 520 may be associated with where in the first memory 411 the plurality of tiles 510 that may be to be the input tile 520 exist. For example, the location may be an address(es) of the plurality of tiles 510 selected as the input tile 520 in the first memory 411.

The size for setting the input tile 520 may be associated with a space occupied by the input tile 520 in the first memory 411. For example, the size may include a storage capacity assigned to the input tile 520 stored at the address of the first memory 411.

Figure 6:
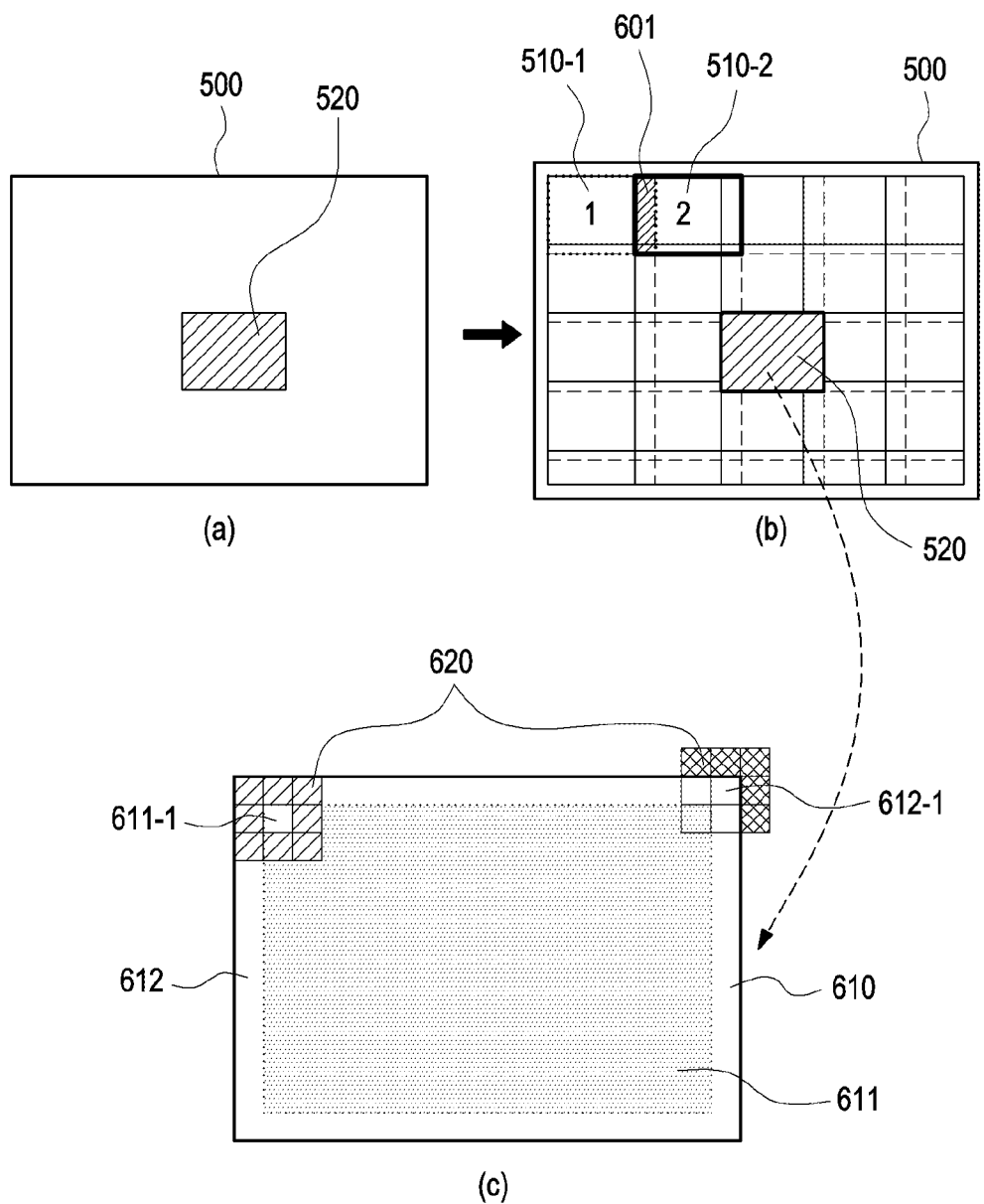
FIG. 6 is an exemplary diagram for describing an output tile according to an embodiment.

FIG. 6 is an exemplary diagram for describing an output tile according to an embodiment.

The second process data for setting processing, included in the process data, may include an overlapping region 601 and a non-processing region that exist between a first tile 510-1 and a second tile 510-2.

The overlapping region for setting processing may be an overlapping portion between adjacent tiles. The image 500 may be divided into the plurality of tiles 510. As shown in FIG. 6(*a*), the image 500 may include the input tile 520.

The image 500 may be divided such that adjacent tiles overlap each other. As shown in FIG. 6(*b*), the first tile 510-1 and the second tile 510-2 that are adjacent divided tiles 510 may include an overlapping region 601 therebetween.

When the second processor 422 processes any one input tile 520, an invalid region edge pixel 612-1 may not be processable due to absence of a neighbor pixel. The invalid region edge pixel 612-1 may be included in a tile processed next, and the location and the size of the next input tile 520 may be determined such that the invalid region edge pixel 612-1 is included in the next input tile 520. When the invalid region edge pixel 612-1 is included in the next input tile 520, the overlapping region 601 may be generated. The second process data regarding the overlap for setting processing may indicate or determine presence/absence of the overlapping region 601 or an area of the overlapping region 601 between adjacent input tiles 520.

The non-processing region for setting processing may be a region of pixels located at an edge of the output tile 610. As shown in FIG. 6(c), when the input tile 520 is processed by the second processor 422, the output tile 610 may be generated. The output tile 610 may include a valid region 611 where processed pixels are located and an invalid region 612 where non-processed pixels are located. According to a type of image processing applied to the input tile 520, a filter 620 in a 3×3 form may be applied to each pixel of the valid region 611 and the invalid region 612 of the output tile 610. The second processor 422 may apply the filter 620 to a valid region edge pixel 611-1 located at an edge of the valid region 611, together with a pixel of the adjacent invalid region 612. The second processor 422 may apply the filter 620 to an invalid region edge pixel 612-1 located at an edge of the invalid region 612. This is because a region to which the filter 620 is applied exceeds a boundary of a tile, and thus adjacent pixels processable together with the invalid region edge pixel 612-1 do not exist. As stated above, existence of the invalid region 612 in the output tile 610 may be a ground for consideration of the overlapping region 601 between the adjacent tiles 510-1 and 510-2.

Referring back to FIG. 5, the second process data for setting processing with respect to the input tile 520 may include a process order and a process location of the input tiles 520.

The process order may be an order of access to all or some of the plurality of tiles 510 divided from the image 500. The access may include DMA by the DMA controller 423. That is, the process order may include a reading order of the input tile 520 stored in the first memory 411 by the DMA controller 423 and a storing order of the output tile 610 in the first memory 411 by the DMA controller 423. All or some of the plurality of tiles 510 may be selected as the input tile 520 by calculation of the first processor 412 or the second processor 422, and the selected input tile 520 may be read from the first memory 411 sequentially one by one or plural by plural by the DMA controller 423, and the read input tile 520 may be processed by the second processor 422, and each process result, the output tile 610, may be stored in the first memory 511 by the DMA controller 423. In this case, the process order may regard to which input tile 520 is to be accessed first and which input tile 520 is to be accessed later in the first memory 411. The process order may also regard to which output tile 610 is to be stored first and which output tile 610 is to be stored later in the first memory 411.

The process location may mean an address of a memory in which a function regarding image processing to be applied by the second processor 422 to the input tile 520 exists. The function may depend on a type of image processing to be applied to the input tile 520. Thus, a location of the function, i.e., a memory address of the function may differ with a type of image processing. More specifically, the process location may be an address of a function of the filter 620, stored in the first memory 411. For example, when a type of image processing is blurring, an address of the first memory 411 in which a function of the filter 620 regarding blurring is stored may correspond to the process location.

The process data may be stored in a cache. The second processor 422 may include the cache capable of storing related data for fast image processing. In the cache, process identification for identifying each image process operation to be performed by the second processor 422 may be stored. The process data provided from a user through the API may vary with each image process operation. Thus, the process data may change with the process identification that identifies each image process operation.

The process identification together with the process data may be stored in the cache in the form of a table. The process identification may be associated with or match with the process data including at least one of the process order, the process location, the location of the input tile 520, the size of the input tile 520, or overlap between the input tiles 520, which are required for an image process operation to be performed currently.

For example, a first process identification indicating a first image process operation with respect to a first image may be associated with or match with the first process data required for the first image process operation. The associating or matching result may be stored in the cache. Next, a second process identification indicating a second image process operation with respect to a second image that is different from the first image may be associated with or match with the second process data required for the second image process operation, and the associating or matching result may be stored in the cache. The second processor 422 may terminate processing of the first image through the first image process operation and then start processing the second image through the second image process operation.

The first processor 412 may provide a command to perform image processing with respect to the input tile 520 to the second processor 422. The first processor 412 may provide a command to perform a particular operation to the second processor 422. The first processor 412 may control the second processor 422 to perform an image process operation. Once the first processor 412 provide a process command to the second processor 422, the second processor 422 may read the input tile 520 stored in the second memory 421 by the DMA controller 423 and perform image processing with respect to the read input tile 520.

The process command may regard to overall operations regarding image processing by the second processor 422 from the start of processing to the end of processing, including aspects of operations. For example, the overall operations may include data transmission and reception between the first processor 412 and the second processor 422. The process command may include a type of image processing, the input tile 510 to be processed, and a memory address regarding the same. The process command may also regard to control of the DMA controller 423 by the second processor 422. The process command may include information about adjustment of image processing. The adjustment may include controlling the second processor 422 to receive the input tile 520 having a designated size.

The second processor 422 may perform image processing with respect to the input tile 520 determined based on the process data. At the same time when the second processor 422 processes an image, the input tile 520 may be prepared. After or at least simultaneously with preparation of the input tile 520, the second processor 422 may complete image processing with respect to the input tile 520. After or at least simultaneously with completion of image processing with respect to the input tile 520 or generation of the output tile 610, the second processor 422 may receive the next input tile 520 and perform image processing with respect to the next input tile 520.

The DMA controller 423 may be connected with the first memory 411, the second memory 421, the first processor 412, and the second processor 422. The DMA controller 423 may control the first memory 411 and the second memory 421 such that data regarding the input tile 520 and the output tile 610 is transmitted or received between the first memory 411 and the second memory 421. Transmission and reception of the DMA controller 423 may be performed by control of the first processor 412 and/or the second processor 422.

The DMA controller 423 may read the input tile 520 according to control of the first processor 411 or the second processor 421. The DMA controller 423 may receive a condition of the input tile 520 calculated by the first processor 411 or the second processor 421 to read the input tile 520. The DMA controller 423 may continuously read a part of the image 500 stored in the first memory 411 corresponding to the condition of the calculated input tile 520. The DMA controller 423 may transmit the continuously read part of the image 500 to the second memory 421. The DMA controller 423 may transmit the output tile 610 generated from the input tile 520 from the second memory 421 to the first memory 411.

The input tile 520 may be stored in the second memory 421 that is adjacent to the second processor 422 because a speed of data access to the second memory 421 of the second processor 422 is high. Thus, for the second processor 422, it may be more effective to sequentially store, read, and process the input tile 520 that is a part of the image 500 in the second memory 421 than to read the image 500 from the first memory 411 having a low data access speed and process the image 500 at a time.

When only a particular part of the image 500 needs to be processed, the image 500 or all of the plurality of tiles 510 do not need to be read. In this case, it may be inefficient for the second processor 422 to perform processing with respect to the image 500 stored in the first memory 411 having a low data access speed. It may also be inefficient for the second processor 422 to perform processing with respect to all of the plurality of tiles 510.

On the other hand, in the electronic device 101, the DMA controller 423 may read the input tile 520 corresponding to the particular part from the first memory 411 and store the same in the second memory 421, and the second processor 422 may perform image processing with respect to the input tile 520 stored in the second memory 421. Thus, the second processor 422 may focus on an operation for image processing. Thus, as a whole, a processing speed with respect to image data may increase, and a processing time may decrease.

Figure 7:
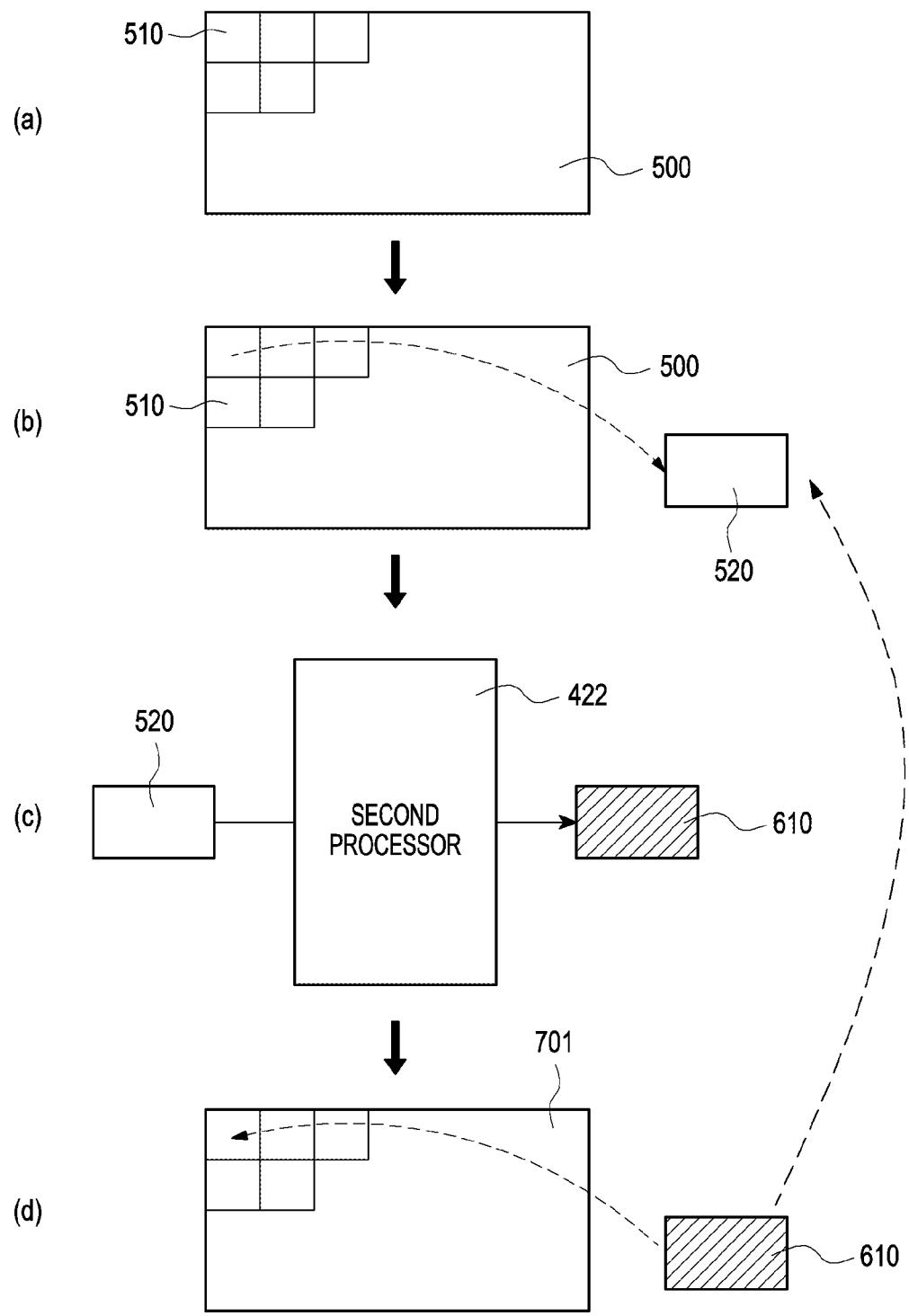
FIG. 7 is an exemplary diagram for describing image processing of a second processor according to an embodiment.
Figure 8:
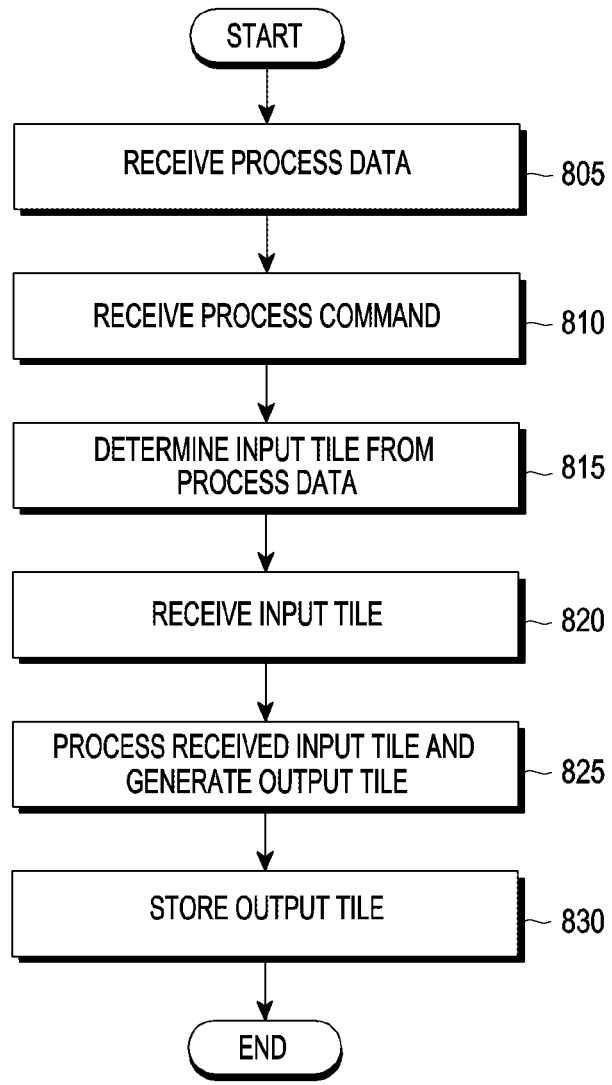
FIG. 8 is a flowchart of image processing according to an embodiment.

FIG. 7 is an exemplary diagram for describing image processing of a second processor according to an embodiment, FIG. 8 is a flowchart of image processing according to an embodiment.

Hereinbelow, referring to FIGS. 7 and 8, an image process operation of the second processor 422 will be described.

As shown in FIG. 7(a), the image 500 may be divided into at least one tile by the first processor 412 or the second processor 422. Herein, the plurality of tiles 510 may include tiles that divide the image 500 that may be divided into the plurality of tiles 510.

As shown in FIG. 7(b), all or some of the plurality of tiles 510 may be determined as the input tile 520 by the first processor 412 or the second processor 422. The determined input tile 520 may be read by the DMA controller 423. The first processor 412 or the second processor 422 may determine (calculate) the input tile 520 based on the process data. The first processor 412 or the second processor 422 may control the DMA controller 423 to read the image 500 from the first memory 411 or store the image 500 in the second memory 421 in the unit of a tile corresponding to the determined (calculated) input tile 520. The DMA controller 423 may continuously read and store the image 500 in the unit of a tile, while the second processor 422 processes the image 500 in the unit of a tile.

More specifically, in operation 805, the second processor 422 may receive process data. The process data may be provided from the user. Reception of the process data by the second processor 422 may be implemented by user's transferring the process data to the second processor 422 through the API. The process data may be received by the first processor 412, and the received process data may be transmitted from the first processor 412 to the second processor 422.

In operation 810, the second processor 422 may receive a process command from the first processor 412. The process command may also include a command for control of the second processor 422 by the first processor 412. More specifically, the process command may also include commanding the second processor 422 to perform an image process order by the first processor 412.

In operation 815, the second processor 422 may determine (calculate) a condition of the input tile 520 to select the input tile 520. As stated above, determination (calculation) of the condition of the input tile 520 may be performed by the first processor 412. The second processor 422 may determine a location and a size of the input tile 520, and an overlapping and/or non-processing region(s) based on the process data. The condition of the input tile 520 may include an address and an assigned storage capacity of the first memory 411.

In the present operation, the second processor 422 may determine (calculate) a condition of image processing to be applied to the input tile 520. The second processor 422 may determine a type of image processing, such as blurring, sharpening, and corner detection, based on the process data. The condition of image processing may include an address of the first memory 411 in which a function regarding the image processing filter 620 is stored.

In operation 820, the second processor 422 may receive the input tile 520 from the second processor 421 sequentially one by one or plural by plural. The received input tile 520 may be prepared by being previously stored in the second memory 421 from the first memory 411 by the DMA controller 423.

As shown in FIG. 7(c), the input tile 520 may be processed by the second processor 422.

More specifically, in operation 825, the second processor 422 may process the received input tile 520 and generate the output tile 610.

As shown in FIG. 7(d), the output tile 610 may be stored in the first memory 411 through the DMA controller 423. The output tile 610 may be stored in a buffer 701 of the first memory 411.

More specifically, in operation 830, the second processor 422 may store the output tile 610 in the second memory 421. The output tile 610 stored in the second memory 421 may be moved to and stored in the first memory 411 by the DMA controller 423. When the output tile 610 is moved to the first memory 411, the output tile 610 may be stored in the original location where the input tile 520, transferred from the second memory 421 to the second processor 422 for image processing, has existed. For example, the output tile 610 may be stored at the address of the first memory 411 where the input tile 520 has existed, as much as a storage capacity allocated to the input tile 520.

Additionally, the second processor 422 may report an image process result to the first processor 412. The image process result may be reported after generation of the output tile 610 in operation 825 or before or after storage of the output tile 610 in operation 830.

Operations 820 and 830 shown in FIGS. 7(*b*) through 7(*d*) may be repeatedly performed for each input tile 520 (as indicated by a dotted line from FIG. 7(*d*) to FIG. 7(*b*)). When all of the plurality of tiles 510 are the input tile 520, image processing may be repeatedly performed for all of the plurality of tiles 510. When some of the plurality of tiles 510 are the input tile 520, image processing may be repeatedly performed for some of the plurality of tiles 510.

The DMA controller 423 may store the input tile 520 from the first memory 411 to the second memory 421. Storage of the input tile 520 from the first memory 411 to the second memory 421 may be controlled by the first processor 412 or the second processor 422. The DMA controller 423 may read the input tile 520 determined (calculated) by the first processor 412 or the second processor 422 from the first memory 411 and store the read input tile 520 in the second memory 421. The DMA controller 423 may transfer the output tile 610 from the second memory 421 to the first memory 411. After image processing, the second processor 422 may store the output tile 610 in the second memory 421. The DMA controller 423 may read the output tile 610 stored in the second memory 421 and store the read output tile 610 in the first memory 411 again.

When the second processor 422 processes the input tile 520, the DMA controller 423 may repeatedly perform movement of the input tile 520 from the first memory 411 to the second memory 421. Thus, the input tile 520 may be prepared at all times in the second memory 421 for image processing.

When the second processor 422 generates the output tile 610 and stores the output tile 610 in the second memory 421, the DMA controller 423 may repeatedly perform movement of the stored output tile 610 from the memory processor 421 to the first memory 411. Thus, the input tile 520 may be prepared in the second memory 421, and at the same time, the output tile 610 may be stored in the first memory 411.

Preparation of the input tile 520 in the second memory 421 in operation 820, image processing in operation 825, and storage of the output tile 610 in operation 830 may be performed at the same time. Due to repetition of operations 820 and 830, the electronic device 101 may perform current input tile processing, current output tile storage, and next input tile preparation in parallel or at the same time.

The second processor 422 may adjust the size of the input tile 520 to be processed. The second processor 422 may adjust the size of the next input tile 520 such that the size of the next input tile 520 is the same as the size of the current input tile 520 currently processed.

The input tile 520 may be changed in size or shape to correspond to the process data. Assume the second processor 422 currently processes the input tile 520 having a first size. Then, when the input tile 520 is changed into a second size that is different from the first size, the input tile 520 having the second size may be stored in the second memory 421 by the DMA controller 423. In this case, the second processor 422 may still read the input tile 520 corresponding to the first size. The second processor 422 may control the DMA controller 423 to read the input tile 520 corresponding to the first size from the first memory 411. In this way, the second processor 422 may process the input tile 520 while adjusting the size of the input tile 520.

Figure 9:
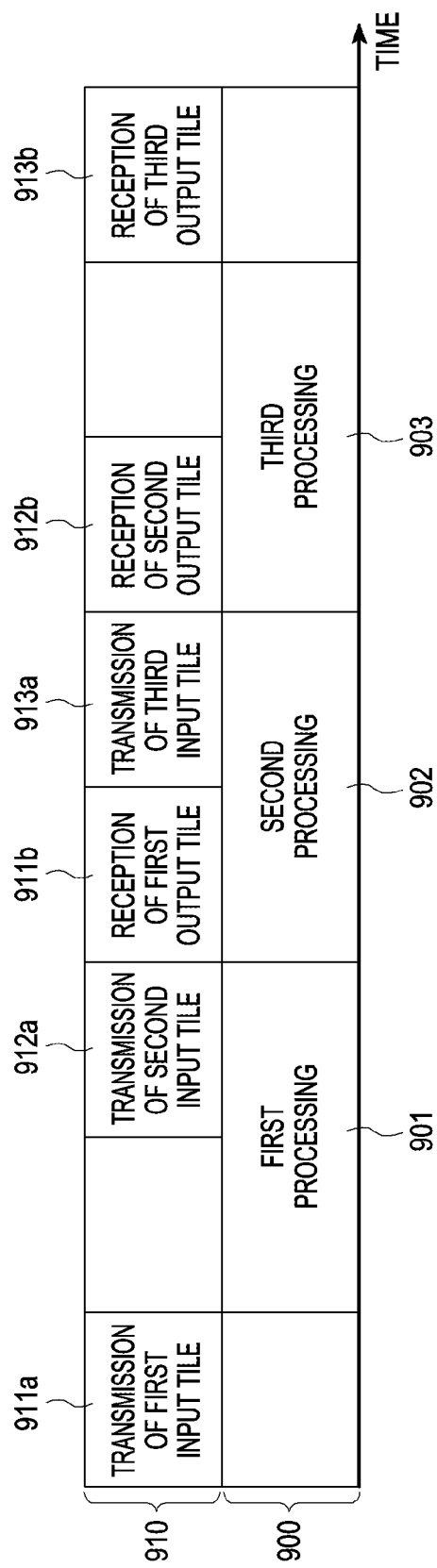
FIG. 9 is an exemplary diagram for describing a process of simultaneously performing tile transmission/reception and tile processing according to an embodiment.

FIG. 9 is an exemplary diagram for describing a process of simultaneously performing tile transmission/reception and tile processing according to an embodiment.

The electronic device 101 may perform data access by the DMA controller 423 and tile processing by the second processor 422 at the same time. As shown in FIG. 9, over time, a second processor process operation 900 and a DMA control operation 910 may be performed simultaneously. The second processor process operation 900 may mean image processing performed with respect to the input tile 520 by the second processor 422. The DMA control operation 910 may include operations 911*a*, 912*a*, and 913*a* of transmitting the input tile 520 to the second memory 421 and transferring the input tile 520 to the second processor 422. The DMA control operation 910 may include operations 911*b*, 912*b*, and 913*b* of receiving the output tile 610 stored in the second memory 421 and storing the output tile 610 in the first memory 411.

First, the DMA controller 423 may transmit a first input tile to the second memory 421 in operation 911*a*. The second processor 422 may then read the first input tile from the second memory 421 which may then perform first processing 901 that processes the first input tile. The second processor 422 may generate a first output tile by processing the first input tile. The second processor 422 may store the first output tile in the second memory 421.

The DMA controller 423 may transmit a second input tile to the second memory 421 during the first processing 901 in operation 912*a*.

When the first processing 901 ends, the second processor 422 may start second processing 902 that processes the second input tile. The second processor 422 may generate a second output tile by processing the second input tile. The second processor 422 may store the second output tile in the second memory 421.

The DMA controller 423 may receive the first output tile from the second memory 421 during the second processing 902 in operation 911*b*.

The DMA controller 423 may transmit a third input tile to the second memory 421 during the second processing 902 in operation 913*a*.

When the second processing 902 ends, the second processor 422 may start third processing 903 that processes the third input tile. The second processor 422 may generate a third output tile by processing the third input tile. The second processor 422 may store the third output tile in the second memory 421.

The DMA controller 423 may receive the second output tile from the second memory 421 during the third processing 903 in operation 912*b*.

The DMA controller 423 may transmit a tile not only during image processing by the second processor 422, but also before start of processing or after completion of processing. The DMA controller 423 may receive the third output tile after completion of the third processing 903 in operation 913*b*.

The second input tile transmission operation 912*a* of the DMA controller 423 may be performed during the first processing 901 of the second processor 901. The first output tile reception operation 911*b* and the third input tile transmission operation 913*a* of the DMA controller 423 may be performed during the second processing 902 of the second processor 422. The second output tile transmission operation 912*b* of the DMA controller 423 may be performed during the third processing 903 of the second processor 422. Thus, the respective process operations 901, 902, and 903 and several tile transmission and reception operations 911b, 912a, 912b, and 913a may occur at the same time. That is, an operation of the DMA controller 423 may partially or entirely overlap an operation of the second processor 422.

To allow the second processor process operation 900 and the DMA control operation 910 to be performed at the same time, the DMA controller 423 may include multiple channels. More specifically, transmission and reception of the input tile 520 and the output tile 610 by the DMA controller 423 may be performed through the multiple channels. For example, assume the DMA controller 423 transmits the first through third input tiles to the second memory 421 through first and second channels. The first input tile and the second input tile may be transmitted to the second memory 421 through the first channel and the second channel, respectively. Herein, when transmission of the first input tile through the first channel is completed first, the DMA controller 423 may generate an interrupt for the second processor 422 that executes an image process operation even during transmission of the second input tile through the second channel. The interrupt may indicate that completion of transmission of the first input tile through the first channel is notified to the second processor 422 and whether to transmit the third input tile through the first channel is asked. In response to the interrupt, the second processor 422 may control the DMA controller 423 to start transmission of the third input tile through the first channel.

Figure 10:
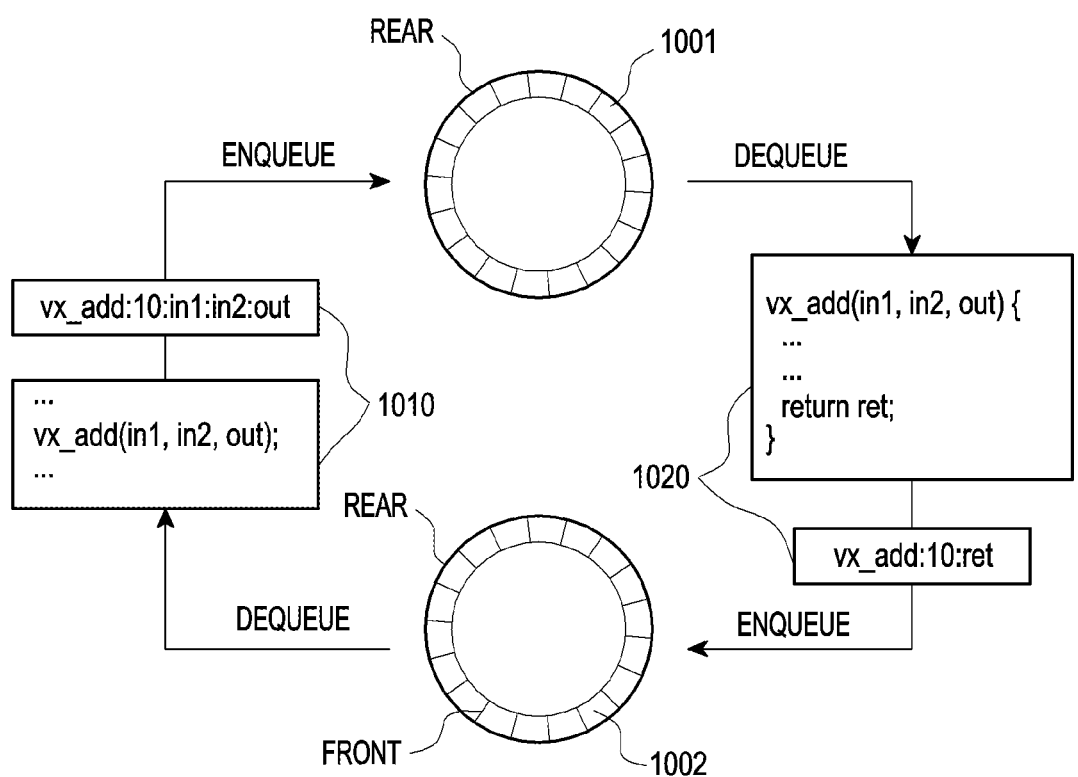
FIG. 10 is an exemplary diagram for describing an algorithm for implementing image processing between processors according to an embodiment.

FIG. 10 is an exemplary diagram for describing an algorithm for implementing image processing between processors according to an embodiment.

In a host-target environment where a host processor and a target processor exist, the host processor may command the target processor to perform a particular task. The host environment and the target environment may be operated based on different OSs. When the host processor and the target processor operate in different OSs, the target processor has to be able to recognize a command of the host processor. Thus, an algorithm for implementing an arbitrary task in the host-target environment may include translation enabling the target processor to recognize the command of the host processor.

The electronic device 101 according to the present disclosure, which has the host-target environment, may include the first processor 412 serving as the host processor and the second processor 422 serving as the target processor. The first processor 412 may transfer a process command to cause the second processor 422 to perform an image processing task. When the first processor 412 and the second processor 422 operate based on different OSs, the algorithm for implementing the image processing task may include translation enabling the second processor 422 to recognize a process command of the first processor 412.

Shown in FIG. 10 is an example of an algorithm that prescribes an image processing task between the first processor 412 and the second processor 422. Such an image processing task algorithm may be expressed with a programming language. The image processing task algorithm may include a process command algorithm 1010 commanding the first processor 412 to perform image processing by the second processor 422 and a process result report algorithm 1020 reporting an image process result from the second processor 422 to the first processor 412.

The process command algorithm 1010 may include parameters including values regarding a process operation, a memory access address, and process operation adjustment.

The value regarding the process operation may indicate image processing the second processor 422 has to perform. The memory access address may indicate the address of the first memory 411 in which the input tile 520 to be processed by the second processor 422 is stored. The memory access address may be an address required for memory access through DMA. The value regarding process operation adjustment may indicate change of the input tile 520 such as equalization of the size of the input tile 520 or change of a type of image processing to be performed.

The memory access address among the parameters may be a host virtual address that may be recognized by the first processor 412 in the host environment. The host virtual address has to be translated into a target virtual address that may be recognized by the second processor 422 in the target environment. The process command algorithm 1010 may include translation of the virtual address.

The process command algorithm 1010 may include formation of a packet that transfers the parameters. A header of the packet may include a process identification that identifies image processing to be applied to the input tile 520 and a packet identification indicating unique characteristics of the packet. A data part of the packet may include data regarding the parameters.

The process command algorithm 1010 may include a first-in-first-out (FIFO) algorithm that transfers the packet from the first processor 412 to the second processor 422. In the process command algorithm 1010, the packet may be enqueued to a process command queue 1001. The packet may be input through a rear of the process command queue 1001. The packet may be dequeued from the process command queue 1001. The packet may be output through a front of the process command queue 1001.

The second processor 422 may decode a transferred packet and generate the process operation, the memory access address, process operation adjustment, and data related thereto. The second processor 422 may extract data corresponding to the generated data from the process data and process the input tile 520 based on the extracted data.

For example, in FIG. 6(b), assume the first processor 412 transfers a process command including image processing, e.g., blurring, with respect to the second tile 510-2 to the second processor 422. The process command algorithm 1010 may include an operation in which the second processor 422 performs image processing, e.g., blurring with respect to the second tile 510-2. The second processor 422 may perform blurring with respect to the second tile 510-2 according to the process command.

The process result report algorithm 1020 may include an operation in which the second processor 422 reports an image process result to the first processor 412. The image process result may regard to a process state including processing or non-processing of the input tile 520.

The process result report algorithm 1020 may include packetizing a process result. The process result report algorithm 1020 may include a FIFO algorithm that transfers the process result packet from the second processor 422 to the first processor 412.

The process result packet may be enqueued to a process command queue 1002. The process result packet may be input through a rear of the process result queue 1002. The process result packet may be dequeued from the process result queue 1002. The process result packet may be output through a front of the process result queue 1002.

Figure 11:
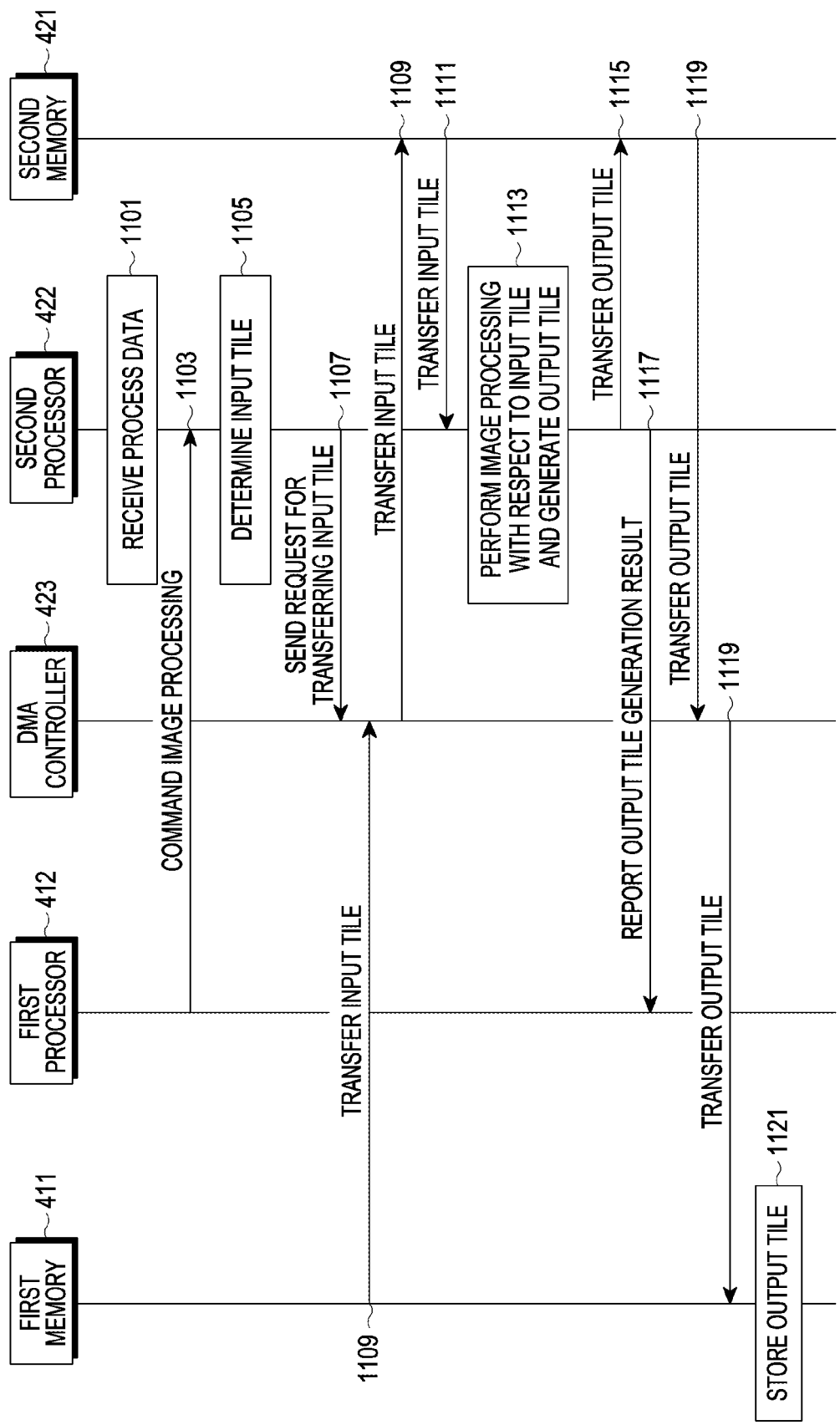
FIG. 11 is a flowchart illustrating an image processing method of an electronic device according to an embodiment.

FIG. 11 is a flowchart illustrating an image processing method of the electronic device 101 according to an embodiment.

In operation 1101, the second processor 422 may receive process data. The process data may be provided from the user through an API. The process data may be received by the first processor 412.

In operation 1103, the first processor 412 may command the second processor 422 to perform image processing. The first processor 412 may command the second processor 422 to perform image processing, based on a process command implemented with the process command algorithm 1010 and the process result report algorithm 1020.

In operation 1105, the second processor 422 may determine (calculate) the input tile 520. Determination of the input tile 520 may include determining a location and a size of the input tile 520 corresponding to the process data. The location of the input tile 520 may mean an address of the first memory 411 of the input tile 520, and the size of the input tile 520 may mean a capacity of the input tile 520 to be processed. In the current operation, determination of the input tile 520 may include determination of an image processing type applied to the input tile 520. The second processor 422 may determine the filter 620 for image processing corresponding to the process data. The first processor 412 may also receive the process data, and thus determination of the input tile 520 and the filter 620 for image processing may also be performed by the first processor 412.

In operation 1107, the second processor 422 may send a request for transferring the input tile 520 corresponding to the location and the size of the determined (calculated) input tile 520 to the DMA controller 423. The second processor 422 may send a request for reading an image process function to be applied to the input tile 520 to the DMA controller 423. The second processor 422 may transmit data required for reading the input tile 520 and the image process function to the DMA controller 423. The data required for reading the input tile 520 may include data regarding an address (location) and a capacity (size) of the first memory 411 of the calculated input tile 520. The first processor 412 may determine the input tile 520, and thus the request for transferring the input tile 520 may also be sent to the DMA controller 523 by the first processor 412.

In operation 1109, the DMA controller 423 may receive the request for transferring the input tile 520 from the second processor 422 and read the calculated input tile 520 from the first memory 411. The DMA controller 423 may read the input tile(s) 520 corresponding to the received memory address and capacity from the second processor 422. In operation 1110, the DMA controller 423 may store the read input tile 520 in the second memory 421.

In operation 1111, the second processor 422 may read the input tile 520 from the second processor 421. The second processor 422 may directly access the second memory 421 and receive the input tile 520.

In operation 1113, the second processor 422 may process the input tile 520 and generate the output tile 610. More specifically, the second processor 422 may apply the filter 620 regarding the image process function determined in operation 1105 to the input tile 520.

In operation 1115, the second processor 422 may transfer the output tile 610 to the second memory 421. The second processor 422 may directly access the second memory 421 to transfer the input tile 520 to the second memory 421.

In operation 1117, the second processor 422 may report an image process result of the input tile 520 to the first processor 412. The image process result may include whether image processing with respect to the input tile 520 is successful.

In operation 1119, the output tile 610 may be moved from the second memory 421 to the first memory 411 and stored in the first memory 411. In operation 1120, the DMA controller 423 may read the output tile 610 from the second memory 421 and store the output tile 610 in the first memory 411.

In operation 1121, the output tile 610 may be stored in the first memory 411 by the DMA controller 423.

An image processing method of an electronic device according to various embodiments of the present disclosure includes storing first data in a first memory at a designated speed, dividing, by a first processor connected with the first memory, the first data into a plurality of second data, each having a size smaller than a size of the first data, storing at least some of the plurality of second data at a speed higher than the designated speed, processing, by a second processor connected with the second memory, at least some of the plurality of second data, and transmitting and receiving, by a DMA control module connected with the second processor, data between the first memory and the second memory, in which the DMA control module is configured to receive from the first memory, at least some of the plurality of smaller-size second data divided from the first data, at least based on a process command with respect to the plurality of second data, transmitted from the first processor to the second processor, to transmit the at least some of the plurality of second data to the second processor, and to transmit third data processed by the second processor using the at least some of the plurality of second data to the first memory.

According to various embodiments of the present disclosure, the first data and the second data may include image data, and the first processor may be configured to determine at least one of a location, a size, a shape, or a number of the at least some of the plurality of second data, based on the second memory.

According to various embodiments of the present disclosure, the at least some of the plurality of second data may include first partial data, second partial data, and third partial data, and the second processor is configured to process the second partial data after processing the first partial data, and the DMA control module may be configured to transmit the processed first partial data to the first memory and receive the third partial data from the second memory, while the second processor processes the second partial data.

According to various embodiments of the present disclosure, in a storage medium having recorded thereon instructions that cause, when executed by at least one processor, the at least one processor to perform at least one operation, the at least one operation includes storing first data in a first memory at a designated speed, dividing, by a first processor connected with the first memory, the first data into a plurality of second data, each having a size smaller than a size of the first data, storing at least some of the plurality of second data at a speed higher than the designated speed, processing, by a second processor connected with the second memory, at least some of the plurality of second data, and transmitting and receiving, by a DMA control module connected with the second processor, data between the first memory and the second memory, in which the DMA control module is configured to receive from the first memory, at least some of the plurality of smaller-size second data divided from the first data, at least based on a process command with respect to the plurality of second data, transmitted from the first processor to the second processor, to transmit the at least some of the plurality of second data to the second processor, and to transmit third data processed by the second processor using the at least some of the plurality of second data to the first memory.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
a first memory storing first data at a designated speed;
a first processor connected with the first memory and configured to divide the first data into a plurality of second data, each of the plurality of second data having a size smaller than a size of the first data, and the plurality of second data comprising first partial data, second partial data, and third partial data;
a second memory storing at least some of the plurality of second data at a speed higher than the designated speed;
a second processor connected with the second memory and configured to process at least some of the plurality of second data; and
a direct memory access (DMA) control module connected with the second processor and configured to transmit and receive data between the first memory and the second memory,
wherein the DMA control module is configured to:
receive, from the first memory, the first partial data and the second partial data, at least based on a process command with respect to the plurality of second data, the process command being transmitted from the first processor to the second processor; and
transmit, to the second processor, the received first partial data and the received second partial data,
wherein the second processor is further configured to process the transmitted second partial data after processing the transmitting first partial data, and
wherein the DMA control module is further configured to transmit the processed first partial data to the first memory and receive the third partial data from the first memory, while the second processor processes the transmitted second partial data.

2. The electronic device of claim 1, wherein the first data and the second data comprise image data, and
wherein the first processor is further configured to determine any one or any combination of a location, a size, a shape, and a number of the at least some of the plurality of second data, based on the second memory.

3. The electronic device of claim 1, wherein the at least some of the plurality of second data is divided into blocks, each of the blocks having an equal size.

4. The electronic device of claim 1, wherein the second processor is further configured to receive process data comprising data for setting the at least some of the plurality of second data and data for setting processing with respect to the at least some of the plurality of second data, and
wherein the process data further comprises any one or any combination of a location and a size of the at least some of the plurality of second data, overlap of processing with respect to the at least some of the plurality of second data, a non-processing area, a process order, a process location.

5. The electronic device of claim 4, wherein the second processor is further configured to control the DMA control module, using the process command and the process data.

6. The electronic device of claim 1, wherein the DMA control module comprises multiple channels comprising a first channel and a second channel, and
wherein the DMA control module is further configured to transmit the received third partial data through the first channel during transmission of the second partial data through the second channel, based on transmission of the first partial data through the first channel being completed.

7. The electronic device of claim 1, wherein the second processor is further configured to transmit, to the DMA control module, determination data that determines the third partial data, and
wherein the DMA control module is further configured to receive, from the first memory, the at least some of the plurality of second data corresponding to the transmitted determination data.

8. The electronic device of claim 4, wherein the second processor further comprises a cache storing a process identification for identifying processing of the second processor with respect to the at least some of the plurality of second data and the process data.

9. The electronic device of claim 1, wherein the process command is implemented with a process command algorithm that prescribes data transmission and reception between the first processor and the second processor, and
wherein the process command algorithm comprises a parameter corresponding to any one or any combination of processing with respect to the at least some of the plurality of second data, adjustment of the processing, a first memory address corresponding to a part of the first memory, and a second memory address corresponding to a part of the second memory.

10. The electronic device of claim 9, wherein the first processor is further configured to generate a packet for transferring the process command and transmit the packet to the second processor, and
wherein the packet comprises the process identification for identifying processing of the second processor with respect to the at least some of the plurality of second data, a packet identification for identifying the packet, and data regarding the parameter.

11. The electronic device of claim 1, wherein the second processor is further configured to transmit, to the first processor, information related to a process state of the plurality of second data.

12. A method comprising:
storing first data in a first memory at a designated speed;
dividing, by a first processor connected with the first memory, the first data into a plurality of second data, each of the plurality of second data having a size smaller than a size of the first data, and the plurality of second data comprising first partial data, second partial data, and third partial data;
storing at least some of the plurality of second data in a second memory at a speed higher than the designated speed;
processing, by a second processor connected with the second memory, at least some of the plurality of second data;
transmitting and receiving, by a direct memory access (DMA) control module connected with the second processor, data between the first memory and the second memory;

receiving, by the DMA control module, from the first memory, the first partial data and the second partial data, at least based on a process command with respect to the plurality of second data, the process command being transmitted from the first processor to the second processor;

transmitting, by the DMA control module, to the second processor, the received first partial data and the received second partial data;

processing, by the second processor, the transmitted second partial data after processing the transmitting first partial data; and transmitting, by the DMA control module, the processed first partial data to the first memory and receive the third partial data from the first memory, while the second processor processes the transmitted second partial data.

13. The method of claim 12, wherein the first data and the second data comprise image data, and wherein the method further comprises, determining, by the first processor, any one or any combination of a location, a size, a shape, and a number of the at least some of the plurality of second data, based on the second memory.

* * * * *